United States Patent [19]

Whittaker et al.

[11] E Re. 30,557

[45] Reissued Mar. 31, 1981

[54] YARN BINDER APPARATUS

[75] Inventors: Roger L. Whittaker, Mocksville; Clyde Hewitt, Hartsville, both of N.C.

[73] Assignee: Hanes Corporation, Winston-Salem, N.C.

[21] Appl. No.: 37,776

[22] Filed: May 7, 1979

Related U.S. Patent Documents

Reissue of:

[64] Patent No.: 4,130,999
Issued: Dec. 26, 1978
Appl. No.: 803,021
Filed: Jun. 3, 1977

[51] Int. Cl.[3] ..... D04B 15/50

[52] U.S. Cl. ..... 66/145 R; 66/140 R

[58] Field of Search ..... 66/140 R, 140 S, 145 R, 66/145 S, 146, 31, 25, 134

[56] References Cited

U.S. PATENT DOCUMENTS

| | | | |
|---|---|---|---|
| 1,763,378 | 6/1930 | Tait et al. | 66/140 R |
| 2,153,459 | 4/1939 | Getaz | 66/140 R |
| 2,824,436 | 2/1958 | Stack et al. | 66/145 R X |
| 3,154,932 | 11/1964 | King | 66/140 R |
| 3,164,975 | 1/1965 | Haberhauer | 66/140 S X |
| 3,186,191 | 6/1965 | Garner | 66/145 R |
| 3,225,571 | 12/1965 | Mahler | 66/145 R X |
| 3,520,154 | 7/1970 | Lawson | 66/140 R |
| 3,760,608 | 9/1973 | Lonati | 66/145 S X |
| 3,861,177 | 1/1975 | Mazzi | 66/145 S |
| 3,881,327 | 5/1975 | Mahler | 66/140 S |

FOREIGN PATENT DOCUMENTS

| | | | |
|---|---|---|---|
| 682473 | 9/1939 | Fed. Rep. of Germany | 66/145 |
| 2707616 | 4/1978 | Fed. Rep. of Germany | 66/145 |
| 1238425 | 7/1960 | France | 66/140 R |
| 647547 | 10/1962 | Italy | 66/140 R |
| 877671 | 8/1969 | Italy . | |
| 877672 | 8/1969 | Italy . | |
| 232437 | 4/1969 | U.S.S.R. | 66/140 S |

*Primary Examiner*—Werner H. Schroeder
*Assistant Examiner*—Andrew M. Falik
*Attorney, Agent, or Firm*—Charles Y. Lackey; William S. Burden

[57] ABSTRACT

Apparatus for binding the severed end portion of a tensioned elastomeric yarn on a circular knitting machine including a binder element fixably mounted up on the machine dial and having a free end portion which normally engages the dial. The free end portion of the binder element has a blade-like edge which is automatically displaced in a first direction by the elastomeric yarn when the yarn is in the knit position and again prior to severing the yarn from the knitted fabric. The retractive forces of the tensioned elastomeric yarn automatically cause the blade-like edge of the binder element to be displaced to wedge the yarn against the dial upon severing the yarn by holding the yarn in position for subsequent reintroduction to the needles.

7 Claims, 15 Drawing Figures

YARN BINDER APPARATUS

Matter enclosed in heavy brackets [ ] appears in the original patent but forms no part of this reissue specification; matter printed in italics indicates the additions made by reissue.

BACKGROUND, BRIEF SUMMARY AND OBJECTS OF THE INVENTION

This invention relates generally to yarn holding devices and more particularly to binders for holding elastomeric yarns in circular knitting machines.

In the knitting of garments, it is common practice to employ a plurality of yarns, elastic and/or inelastic, which are introduced to and removed from the knitting operation selectively according to a predetermined pattern to achieve the desired knitted fabric for the garments. Feed fingers are provided at various yarn feed stations to introduce and remove yarns from the knitting position, as required. When a given yarn is removed, it is severed in a conventional manner, and the free end retained by a holding device so that the yarn will be available for reintroduction to the needles.

Elastomeric yarns currently are in wide use in the production of garments by circular knitting machines. Normally these yarns must be knit under tensions of up to five grams. When the elastomeric yarns are not in use during the garment knitting cycle they must be retained in a ready position for subsequent reintroduction to the machine needles.

Clamps upon knitting machines for holding the free ends of yarns are old and well known. For example, U.S. Pat. No. 3,164,975 discloses the use of leaf springs for clamping threads to a dial cap. Such holding means have been generally satisfactory for inelastic yarns. However, they have been unsatisfactory in knitting elastomeric yarns due to the retractive forces of such yarns, causing them to withdraw from the restraining action of the clamps. This results in the elastomeric yarns having to be rethreaded manually in the machine.

The use of positively displaceable yarn clamps for elastic yarns are well known, for example, as disclosed by U.S. Pat. No. 3,379,036. While the holding action of such positively displaceable clamping means has been generally satisfactory, they must depend upon and must operate in timed relation with various components of the knitting machine, such as the main pattern drum or other sequence regulating devices.

The yarn binder of the present invention includes a metallic member attached to a support mounted upon the dial cap of a conventional knitting machine. The dial cap defines an opening permitting a free edge of the metallic member to rest upon, with a slight pressure, the dial plate or pad. The member is angularly disposed relative to the dial plate such that as a finger-feeding elastic yarn is withdrawn, the end of the elastic yarn is pulled across the dial plate and wedges itself between the metallic member and the flat surface of the dial pad. The yarn is severed, and the end retracts trapping itself at the wedge point until it is to be reintroduced to the needles.

One of the primary objects of the invention is the provision of a new and improved yarn binder for elastomeric yarns.

Another object of the invention is the provision of a binder for elastomeric yarns which operates automatically independent of various machine operational components.

A further object of the invention is the provision of a new and improved yarn binder which is of simple, economical construction and which locks or grips the elastomeric yarn when in the non-feed position and which permits the yarn to be conveniently released when yarn is again introduced to the needles.

Still another object of the invention is a self-cleaning yarn binder which is of durable construction, reduces yarn waste and eliminates wear on the yarn.

Other objects and advantages of the invention will become apparent when considered in view of the following detailed description of the invention.

DETAILED DESCRIPTION OF THE INVENTION

Figure 1:
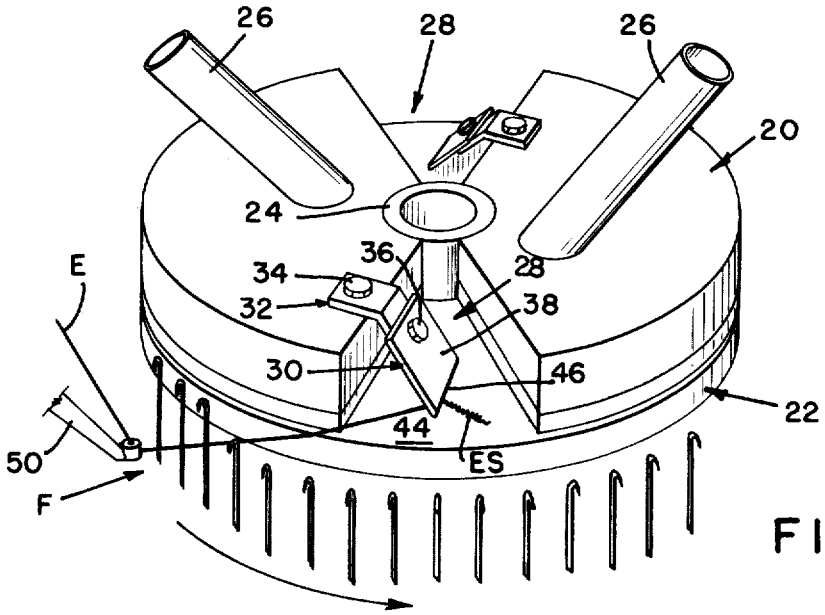
FIG. 1 is a fragmentary perspective view of one embodiment of the yarn binder of the present invention illustrating the binder holding an elastomeric yarn.

Referring to the drawing, and particularly to FIG. 1, reference numeral 20 designates a dial cap and numeral 22 designates a dial pad or plate of a conventional circular knitting machine. The dial cap may be of a conventional type having a hub 24 and vacuum tubes 26.

The dial cap 20 is provided with generally triangular shaped openings 28 as will be subsequently described. Conventional dial cap constructions may have portions cut or otherwise removed therefrom to form the openings 28.

The yarn binder 30 of this invention is conveniently mounted upon the dial cap 20 of a circular knitting machine. The binder 30, as illustrated, consists of an elongated, metallic member 38 having one end secured to a bracket 32 by releasable fastener 36. The bracket is secured to the dial cap 20 by a releasable fastener 34. The bracket 32 includes first and second sections 40, 42 angularly disposed relative to each other.

The metallic member 38 is secured adjacent one end 37 to the bracket 32 by fastener 36, while the opposite blade-like edge rests upon the upper flat surface 44 of the dial pad 22 exposed by an opening 28.

Figure 4:
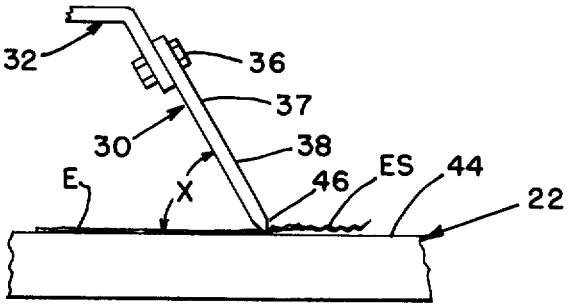
FIG. 4 is an enlarged fragmentary view of a dial plate and a binder element illustrating the biting and wedging action upon an elastomeric yarn.
Figure 3:
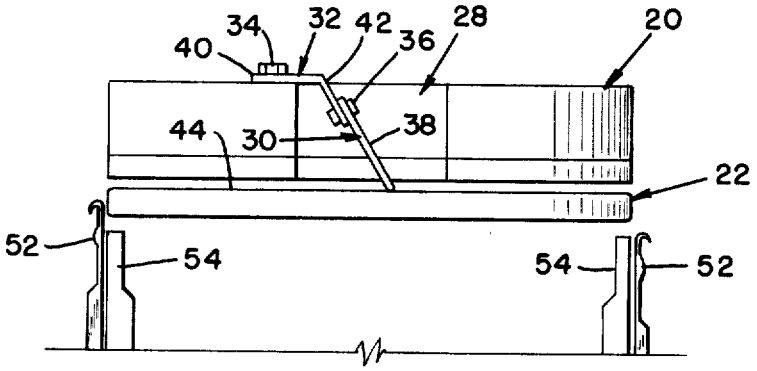
FIG. 3 is a schematic, fragmentary side elevational view of a dial cap and dial plate in relation of the needle cylinder and needles and illustrating the yarn binder of the present invention.

In the embodiment illustrated, the metallic member 38 is of spring steel construction having a width of approximately two centimeters. The spring member 38 extends downwardly from the fastener 36 at a relatively steep angle X as shown by FIGS. 1, 3 and 4, with a flat end or edge 46 in contact with dial plate surface 44. While the angle X, FIG. 4, approaches 90°, the flat end 46 of the blade-like member 38 is downstream of the upper fixed end 37, in the direction of yarn travel.

Angularly positioning the member 38 in this manner permits the end 46 to deflect to the right, FIG. 4, releasing elastomeric yarn E as it is pulled to the right. As the yarn E moves under the end 46 and the yarn subsequently severed, in a conventional manner by blade 45, FIG. 8, the retractive forces in the yarn towards the left in FIG. 4, tend to displace the end 46 of member 38 to the left further wedging or biting into the yarn E between the end 46 and the flat surface 44 of dial pad 22. FIGS. 11A–11E illustrate deflections of the outer end 46 of element 38, as yarn E is positioned thereunder, the end severed, and the yarn again reintroduced to the machine needles.

Figure 5:
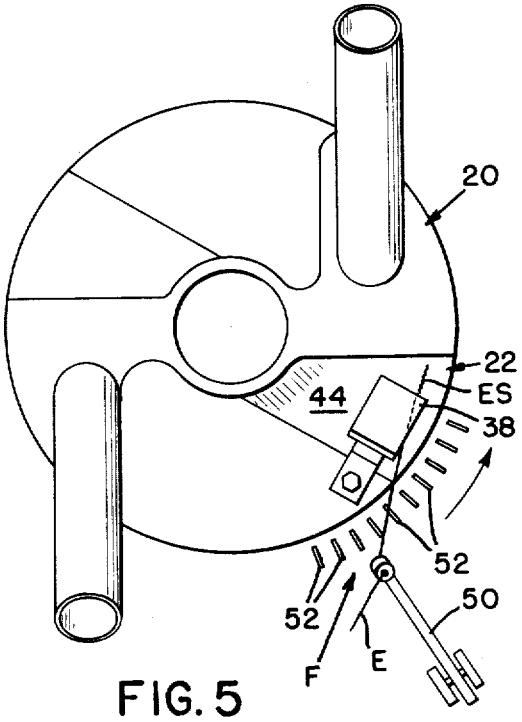
FIGS. 5–7 illustrate the path of the elastomeric yarn when reintroducing the yarn to the needles and self-clearing of the yarn from the binder.
Figure 6:
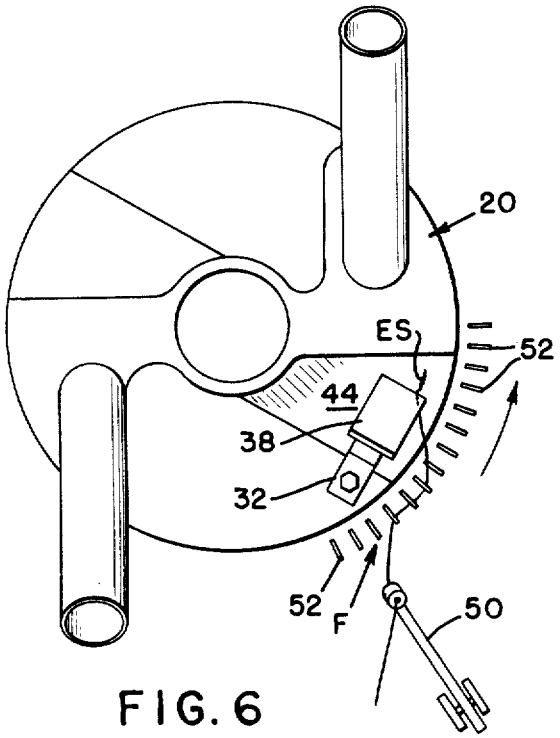
Figure 7:
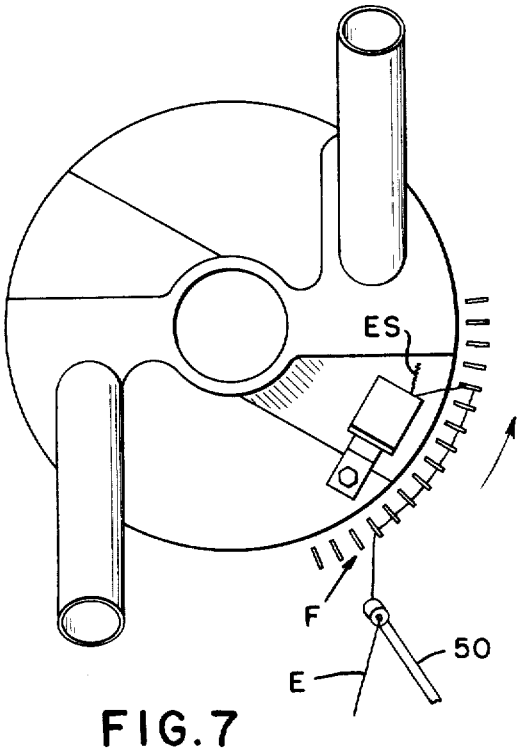
Figure 11A:
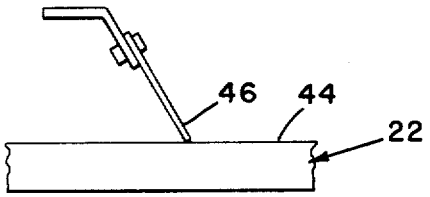
FIGS. 11A–11E are enlarged, fragmentary views of the dial plate and the binder element illustrating the deflection of the lower end of the binder element as yarn is introduced to and removed therefrom.
Figure 11B:
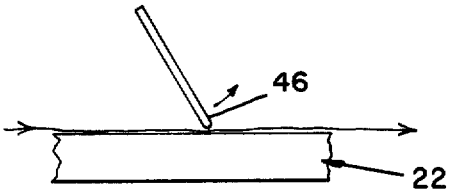
Figure 11C:
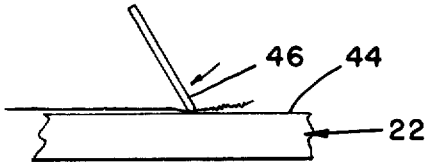
Figure 11D:
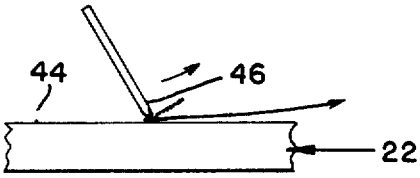
Figure 11E:
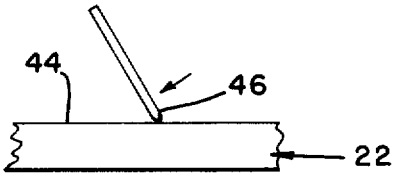

The sequence of operation of the yarn binder upon a knitting machine is shown by FIGS. 5–8. In FIG. 5 the elastomeric yarn E extends from a supply source, not shown, through a yarn feed finger 50 and is bound between flat surface 44 of dial pad 22 and the lower displaceable edge of the binder element 38. The feed finger 50 is in a raised position and the yarn E passes over the needles 52, FIG. 9. Referring to FIG. 6, when the yarn E is to be reintroduced into the knitting operation, the feed finger 50 is pivoted downwardly in a conventional manner to the FIG. 10 position such that the yarn enters the needles 52 at feed station F. FIG. 7 illustrates the self-clearing action of the yarn binder as the needles move counterclockwise to pull the severed yarn end ES from under the binder element 38.

Figure 9:
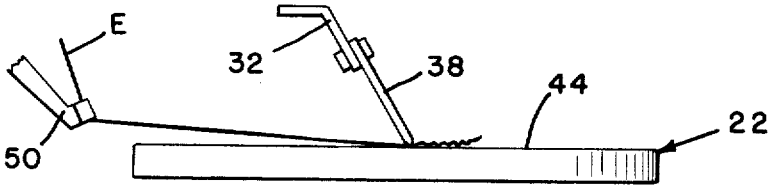
FIG. 9 is a fragmentary schematic, side elevational view of the binder and dial pad with elastomeric yarn held in a non-feed position by a feed finder.
Figure 10:
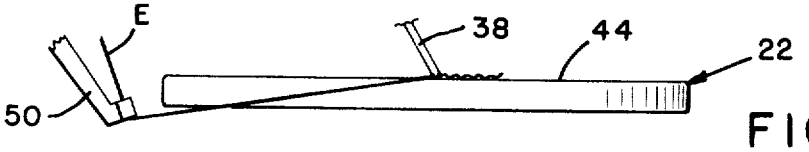
FIG. 10 is a view similar to FIG. 9 with the yarn being held in a feed position by the feed finger for introduction to the needle.
Figure 2:
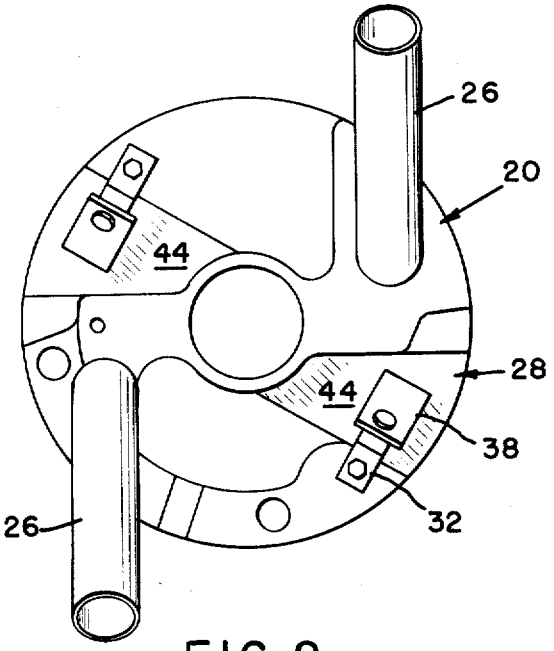
FIG. 2 is a schematic, top-plan view of a dial cap and a dial plate for a circular knitting machine illustrating the positioning thereon of yarn binders of the present invention.
Figure 8:
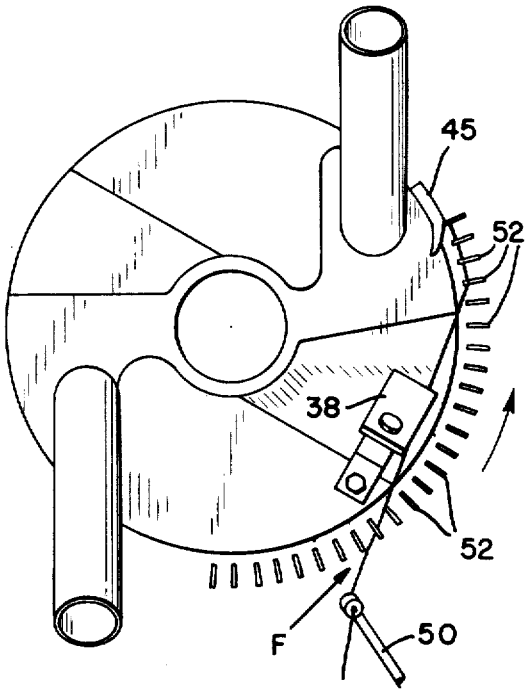
FIG. 8 illustrates the path of the elastomeric yarn when the yarn is positioned between the binder and the dial plate prior to severing of the yarn from the knitted fabric.

When the elastomeric yarn is to be removed from the knitting position, the yarn feed finger 50 lifts the yarn at station F, FIGS. 8 and 9, to a position above the needles in a known manner, and the yarn E slides across the flat surface 44, defining a chord across the plate 22, and under the element 38 as the needles 52 move about the cylinder 54. Subsequently, the yarn is severed in a conventional manner from the knit fabric and the yarn again clamped by the element 38 to surface 44.

Thus it can be seen that the yarn binder is extremely simple in both construction and operation. While the element 38 may be of various selected dimensions, configurations and construction, it is essential that the lower end portion be capable of displacement or deflection to readily permit removal of the yarn, introduction of the yarn and a gripping, wedging or biting action upon the yarn due to the retractive forces in the yarn after severing of such yarn.

While one yarn binder has been described, it is to be understood that a plurality of binders may be provided upon a single dial cap.

I claim:

1. Apparatus in a knitting machine for holding a tensioned elastomeric yarn adjacent a severed end portion comprising; support means including *a dial cap and a dial pad, said dial pad having* a flat surface, *said dial cap having a flat upper surface*, an elongated *yarn* binder element *consisting of an elongated linear member* of spring steel construction having one end fixedly mounted upon said support means and having a displaceable free end portion defining a blade-like edge for normally engaging said flat surface *with slight pressure, said support means including a bracket having angularly disposed integral first and second sections, said first section being in parallel relation to said flat upper surface, fastener means releasably securing said first section to said dial cap with said second section being inclined downwardly with respect to said first section, said second section being positioned at an angle approaching 90° with respect to said flat surface, means securing said binder element to said second section with said second section being in parallel with said elongated linear member*, said binder element being anularly positioned relative to said flat surface such that the free end portion of said binder element is displaceable in a first direction by the elastomeric yarn as the yarn moves in a first path between said binder element and said flat surface, and is displaceable to a second position for wedging and biting into the elastomeric yarn to grip the yarn between said binder element free end and said flat surface due to the retroactive forces in the tensioned elastomeric yarn upon severing of the yarn.

2. Apparatus as recited in claim 1, wherein said elongated element is angularly disposed with said free end portion extending in the first path of movement of the elastomeric yarn, and the portion of said elongated member remote to said blade-like edge is *releasably* fixed to said support means *bracket*.

3. Apparatus in a knitting machine for holding a tensioned elastomeric yarn adjacent a severed end portion comprising: support means *including a bracket having angularly disposed first and second sections*, [a] *an elongated linear* binder element mounted upon said support means and having a displaceable free end portion normally engaging said support means, said free end portion of said binder element being displaceable in a first direction by said elastomeric yarn as the yarn moves in a first path between said binder element and said support means, and being displaceable to a second position for wedging and biting into the elastomeric yarn to grip the yarn between said binder element free end and said support means due to the retroactive forces in the tensioned elastomeric yarn upon severing of the yarn, said support means including a flat surface and said binder element comprising an elongated member with said free end portion angularly disposed with respect to said flat surface and defining a blade-like edge normally engaging said flat surface and capable of displacement in said first and second directions generally along said first path, said support means further including a dial cap and a dial pad of a circular knitting machine, said dial cap having *said bracket first section secured thereto and said bracket second section having* a second end of said elongated *linear* element fixedly secured thereto, and said dial pad defining said flat surface of said support means.

4. Apparatus as recited in claim 3, said dial cap including portions defining an opening therethrough for receiving *at an angle* said elongated *linear* member and permitting said blade-like edge to rest upon said flat surface, *said elongated linear member being of spring steel construction.*

5. Apparatus as recited in claim 4, said apparatus further including a rotatable needle cylinder, a plurality of independent needles carried thereby, yarn severing means, a yarn feed station, a feed finger positioned at said feeding station and displaceable to a first position for feeding the elastomeric yarn to said needles, said needles upon rotation automatically clearing the gripped yarn from said elongated *linear* element for knitting of the elastomeric yarn into fabric.

6. Apparatus as recited in claim 5, said severing means being positioned at the periphery of said dial cap at a location remote to said feed station, said feed finger being displaceable to a second position for removing the yarn from said needles at said feed station whereby continuous rotation of the needles will pull the yarn between said flat surface and said elongated element and across said severing means to remove the elastomeric yarn from the knit fabric and for binding the elastomeric yarn severed end.

[7. A circular knitting machine including a rotary needle cylinder, a plurality of needles carried thereby, a dial cap, a dial pad, a yarn feed station located at the periphery of said dial cap, an elastomeric yarn feed finger positioned at said feed station, an elastomeric yarn severing means mounted upon said dial cap remote to said feeding station, an elongated yarn binder element, means fixedly mounting said binder element adjacent one end portion upon said dial cap with said binder element being angularly inclined downwardly from said mounting means towards said dial pad, said binder element including a displaceable free end portion defining a blade-like edge for normally engaging said dial pad intermediate said binder element mounting means and said severing means, said binder element blade-like edge being displaceable in a first direction by the elastomeric yarn, in response to displacement of a tensioned elastomeric yarn by said feed finger and needles, to a path defining a chord across said dial pad and between said blade-like edge and said dial pad flat surface, and being displaceable automatically in a second direction generally opposite said first direction upon severing of the elastomeric yarn by said severing means for biting into and wedging the elastomeric yarn against said dial pad due to the retroactive forces in said tensioned, severed elastomeric yarn.]

[8. Apparatus as recited in claim 7, wherein said binder element comprises an elongated member of spring steel construction.]

*9. A circular knitting machine including a rotary needle cylinder, a plurality of needles carried thereby, a dial cap, a dial pad, a yarn feed station located at the periphery of said dial cap, an elastomeric yarn feed finger positioned at said feed station for directing an elastomeric yarn to said needles, an elastomeric yarn severing means mounted adjacent said dial cap remote to said feeding station, an elastomeric yarn binder element for holding a tensioned elastomeric yarn adjacent a severed end portion, said dial pad defining a flat surface, said dial cap including a hub and portions defining at least one generally triangular shaped opening for receiving the binder element therethrough, said binder element consisting of an elongated, rectangular, relatively flat, linear member of spring steel construction having a blade-like edge of approximately two centimeters in width at one end portion, means supporting said elongated linear member with said blade-like edge resting with slight pressure upon said dial pad flat surface adjacent the outer peripheral edge of said dial pad, said supporting means including a bracket having angularly disposed first and second sections, means releasably securing said first section to an upper portion of said dial cap with said first section being fixed substantially parallel with said dial pad flat surface, said second section integral with said first section and inclined downwardly with respect to said bracket first section and said dial cap, means releasably securing said elongated linear member adjacent an end portion remote to said blade-like edge upon said bracket second section in generally parallel relation therewith and with said linear member being inclined downwardly within said triangular shaped opening and with said blade-like edge engaging said dial pad flat surface intermediate said bracket and said severing means, said linear member blade-like edge being displaceable in a first direction by the elastomeric yarn, in response to displacement of the tensioned elastomeric yarn by said feed finger and needles, to a path defining a chord across said dial pad and between said blade-like edge and said dial pad, and being displaceable automatically in a second direction opposite said first direction by the elastomeric yarn upon severing of the elastomeric yarn by said severing means for biting into and wedging the elastomeric yarn against said dial pad flat surface due to the retractive forces in the elastomeric yarn.*

* * * * *